United States Patent Office 3,350,447
Patented Oct. 31, 1967

3,350,447
N-PHENYLCARBAMOYLMETHYL
SULFONIUM IODIDES
Kenneth Wayne Ratts, Creve Coeur, Mo., assignor to Monsanto Company, St. Louis, Mo., a corporation of Delaware
No Drawing. Filed June 28, 1965, Ser. No. 467,675
5 Claims. (Cl. 260—562)

This invention relates to new and useful sulfonium iodides of the formula

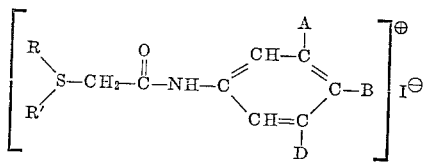

wherein R and R' are like or unlike lower alkyl (e.g. methyl, ethyl, propyl, butyl, and the various isomeric forms thereof having up to and including four carbon atoms), wherein A and D are hydrogen, methyl, chlorine or bromine, wherein B is hydrogen, methyl, chlorine, bromine or nitro, and wherein at least one of A, B and D is hydrogen.

These new sulfonium iodides are prepared by reacting in a fluid system an α-iodoacetanilido compound of the formula

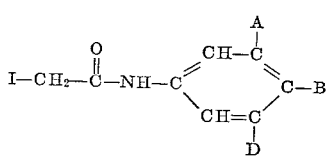

wherein A, B and D have the aforedescribed significance with at least an equimolecular proportion of a sulfide of the formula R—S—R' wherein R and R' have the aforedescribed significance. Exemplary of operable sulfide reactants are dimethyl sulfide, diethyl sulfide, diisopropyl sulfide, di-n-butyl sulfide, methylethyl sulfide, methylisopropyl sulfide, methyl-n-butyl sulfide, etc. Exemplary of operable α-iodoacetanilido reactants are α-iodoacetanilide, p-methyl-α-iodoacetanilide, m,p-dimethyl-α-iodoacetanilide, p-chloro-α-iodoacetanilide, m,p-dichloro-α-iodoacetanilide, m,m'-dichloro-α-iodoacetanilide, p-bromo-α-iodoacetanilide, p-nitro-α-iodoacetanilide, m-methyl-p-chloro-α-iodoacetanilide, m-methyl-p-nitro-α-iodoacetanilide, m-chloro-p-nitro-α-iodoacetanilide, etc.

As illustrative of the preparation of the sulfonium iodides of this invention but not limitative thereof is the following:

EXAMPLE I

To a suitable reaction vessel is charged at room temperature 2.6 parts by weight (substantially 0.01 mole) of α-iodoacetanilide, 2.0 parts by weight (substantially 0.03 mole) of dimethyl sulfide, approximately 45 parts by weight of benzene and approximately five parts by weight of methyl alcohol. The so charged mass is allowed to stand for about sixteen hours at room temperature and then filtered. The filter cake is recrystallized from methyl alcohol to give dimethyl(N-phenylcarbamoylmethyl)sulfonium iodide, which melts with decomposition at 118–120° C.

EXAMPLE II

Employing the procedure of Example I but replacing dimethyl sulfide with an equimolecular amount of diethyl sulfide there is obtained diethyl(N-phenylcarbamoylmethyl)sulfonium iodide, a solid.

EXAMPLE III

Employing the procedure of Example I but replacing α-iodoacetanilide with an equimolecular amount of p-methyl-α-iodoacetanilide there is obtained solid dimethyl-(N-p-tolylcarbamoylmethyl)sulfonium iodide.

EXAMPLE IV

To a glass tube is charged 3.0 parts by weight (substantially 0.01 mole) of p-chloro-α-iodoacetanilide and 0.65 part by weight (substantially 0.01 mole) of dimethyl sulfide and the glass tube sealed. The sealed tube is then placed in an oil bath and maintained at 100° C. for three hours. The glass tube is removed, cooled to room temperature, broken open, and the contents washed out with benzene. The benzene washings are combined and filtered. The filter cake is dimethyl(N-p-chlorophenylcarbamoylmethyl)sulfonium iodide which melts with decomposition at 141° C.

EXAMPLE V

Employing the procedure of Example IV but replacing p-chloro-α-iodoacetanilide with an equimolecular amount of m,p-dichloro-α-iodoacetanilide there is obtained dimethyl(N - m,p - dichlorophenylcarbamoylmethyl)sulfonium iodide, a solid.

EXAMPLE VI

Employing the procedure of Example IV but replacing p-chloro-α-iodoacetanilide with an equimolecular amount of p-nitro-α-iodoacetanilide there is obtained dimethyl-(N-p-nitrophenylcarbamoylmethyl)sulfonium iodide, a solid.

Other sulfonium iodides of this invention include
Dimethyl(N-m-chlorophenylcarbamoylmethyl) sulfonium iodide,
Dimethyl(N-p-chloro-m-tolylcarbamoylmethyl) sulfonium iodide,
Dimethyl(N-p-nitro-m-tolylcarbamoylmethyl) sulfonium iodide,
Dimethyl(N-m-chloro-p-nitrophenylcarbamoylmethyl) sulfonium iodide,
Diethyl(N-m,p-dichlorophenylcarbamoylmethyl) sulfonium iodide,
Di-n-propyl(N-m,m'-xylylcarbamoylmethyl)sulfonium iodide,
Methylethyl(N-phenylcarbamoylmethyl)sulfonium iodide,
Methylethyl(N-p-chlorophenylcarbamoylmethyl) sulfonium iodide, etc.

These new sulfonium iodides are fungicidally active particularly against *Venturia inaequalis* (the fungus which causes apple scab). For example, at a concentration of 300 p.p.m. of dimethyl(N-phenylcarbamoylmethyl)sulfonium iodide in water gave an 87 percent control of the germination of viable spores of said fungus, i.e. spores which would normally germinate under normal conditions of the control.

The exact concentration of the fungicidal agents of this invention employed in combatting or controlling fungal organisms can vary considerably provided the required dosage (i.e., fungicidally toxic amount) thereof is supplied to the organisms or the environment of the organisms. When the extending agent is a liquid or mixture of liquids (e.g. as in solutions, suspensions, emulsions, or aerosols) the concentration of the fungicidal agent employed to supply the desired dosage generally will be in the range of 0.001 to 50 percent by weight. When the extending agent is a semi-solid or solid, the concentration of the fungicidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal spray or particulate solid. In such a concentrate composition, the fungicidal agent generally will be present in a concentration of 5 to 95 percent by weight, the residue being any one or more of the well-known fungicidal adjuvants, such as the various surface active agents (e.g., detergents, a soap or other emulsifying or wetting agent, surface-active clays), solvents, diluents, carrier media, adhesives, spreading agents, humectants, and the like.

In controlling or combatting fungal organisms the fungicidal agents of this invention either per se or compositions comprising same are supplied to the fungal organisms or to their environment in a lethal or toxic amount. This can be done by dispersing the new fungicidal agent or fungicidal composition comprising same in, on or over an infested environment or in, on or over an environment the fungal organisms frequent, e.g. agricultural soil or other growth media or other media infested with the fungal organisms or attractable to the organisms for habitational or sustenance or propagational purposes, in any conventional fashion which permits contact between the organisms and the fungicidal agents of this invention. Such dispersing can be brought about by applying the fungicidal agent per se or sprays or particulate solid compositions containing same to a surface infested with the fungal organisms or attractable to the organisms, as for example, the surface of agricultural soil or other media such as the above ground surface of plants by any of the conventional methods, e.g. power dusters, boom and hand sprayers, and spray dusters. Also for sub-surface application such dispersing can be carried out by simply mixing the new fungicidal agent per se or fungicidal spray or particulate solid compositions comprising same with the infested environment or with the environment the fungal organisms frequent, or by employing a liquid carrier for the new fungicidal agent to accomplish sub-surface penetration and impregnation therein.

What is claimed is:
1. A sulfonium iodide of the formula

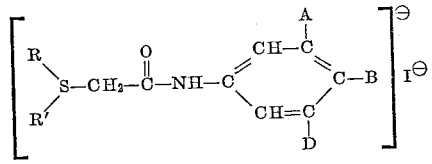

wherein R and R' are lower alkyl, wherein A and D are selected from the group consisting of hydrogen, chlorine and bromine, wherein B is selected from the group consisting of hydrogen, chlorine, bromine and nitro, and wherein at least one of A, B and D is hydrogen.
2. Dimethyl(N-phenylcarbamoylmethyl)sulfonium iodide.
3. Dimethyl(N - p - chlorophenylcarbamoylmethyl)sulfonium iodide.
4. Diethyl(N - phenylcarbamoylmethyl)sulfonium iodide.
5. A sulfonium iodide of the formula

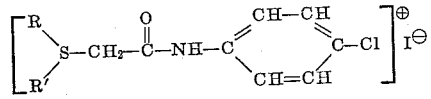

wherein R and R' are lower alkyl.

References Cited

UNITED STATES PATENTS

| | | | |
|---|---|---|---|
| 2,193,963 | 3/1940 | Harris | 260—607 |
| 2,703,588 | 9/1956 | O'Brien | 167—30 |
| 2,758,051 | 8/1956 | Smith | 167—30 |
| 2,948,736 | 7/1960 | Martin | 260—326.3 |
| 3,005,850 | 10/1961 | Wright | 260—562 |
| 3,047,631 | 7/1962 | Rocklin | 260—607 |
| 3,161,680 | 12/1964 | McManus | 260—562 |

FOREIGN PATENTS 1,246,163  10/1960  France.

OTHER REFERENCES

Howard et al., Jour. Amer. Chem. Soc., vol. 80, page 3928 (1958).

Protiva et al., Coll. Czechoslov. Chem. Communs., vol. 20, pp. 810–16 (1955).

Theilheimer, Synthetic Methods of Organic Chemistry, vol. 6, pp. 341–2 (1952).

Theilheimer, Synthetic Methods of Organic Chemistry, vol. 8, page 384 (1954).

WALTER A. MODANCE, *Primary Examiner.*

JULIAN S. LEVITT, *Examiner.*

N. TROUSOF, S. D. FRIEDMAN, *Assistant Examiner.*